(12) United States Patent
Homan et al.

(10) Patent No.: US 7,239,145 B2
(45) Date of Patent: Jul. 3, 2007

(54) SUBSURFACE ELECTROMAGNETIC MEASUREMENTS USING CROSS-MAGNETIC DIPOLES

(75) Inventors: Dean M. Homan, Sugar Land, TX (US); Dzevat Omeragic, Sugar Land, TX (US); Tianhua Zhang, Beijing (CN); Nicolas Sebline, Houston, TX (US)

(73) Assignee: Schlumberger Technology Center, Sugar Land, TX (US)

( * ) Notice: Subject to any disclaimer, the term of this patent is extended or adjusted under 35 U.S.C. 154(b) by 0 days.

(21) Appl. No.: 10/812,369

(22) Filed: Mar. 29, 2004

(65) Prior Publication Data

US 2005/0212520 A1  Sep. 29, 2005

(51) Int. Cl.
*G01V 3/18*  (2006.01)
(52) U.S. Cl. ................................. 324/356; 324/347
(58) Field of Classification Search ................ 324/347, 324/356
See application file for complete search history.

(56) References Cited

U.S. PATENT DOCUMENTS

| | | | |
|---|---|---|---|
| 3,808,520 A | 4/1974 | Runge | |
| 3,973,181 A | 8/1976 | Calvert | |
| 4,383,220 A | 5/1983 | Baldwin | |
| 4,697,190 A | 9/1987 | Oswald | |
| 4,857,852 A | 8/1989 | Kleinberg et al. | |
| 5,168,234 A | 12/1992 | Freedman | |
| 5,235,285 A | 8/1993 | Clark et al. | |
| 6,147,496 A | 11/2000 | Strack et al. | |
| 6,163,155 A | 12/2000 | Bittar | |
| 6,191,588 B1 | 2/2001 | Chen | |
| 6,297,639 B1 | 10/2001 | Clark et al. | |
| 6,476,609 B1 * | 11/2002 | Bittar | 324/338 |
| 6,493,632 B1 | 12/2002 | Mollison et al. | |
| 6,557,794 B2 | 5/2003 | Rosthal et al. | |
| 6,566,881 B2 | 5/2003 | Omeragic et al. | |
| 6,600,321 B2 | 7/2003 | Evans | |
| 6,667,620 B2 | 12/2003 | Homan et al. | |
| 6,690,170 B2 | 2/2004 | Homan et al. | |
| 6,711,502 B2 | 3/2004 | Mollison et al. | |
| 6,768,299 B2 | 7/2004 | Almaguer et al. | |
| 6,788,065 B1 * | 9/2004 | Homan et al. | 324/338 |
| 6,957,708 B2 * | 10/2005 | Chemali et al. | 175/50 |
| 6,975,120 B2 * | 12/2005 | Amini | 324/339 |
| 2003/0055565 A1 * | 3/2003 | Omeragic | 702/7 |
| 2003/0085707 A1 | 5/2003 | Minerbo et al. | |
| 2003/0164706 A1 | 9/2003 | Iwanicki et al. | |

* cited by examiner

*Primary Examiner*—Bot LeDynh
(74) *Attorney, Agent, or Firm*—Osha Liang; Bryan L. White; Kevin P. McEnaney (57) ABSTRACT

Sensor assemblies including transmitter and receiver antennas to respectively transmit or receive electromagnetic energy. The sensor assemblies are disposed in downhole tools adapted for subsurface disposal. The receiver is disposed at a distance less than six inches (15 cm) from the transmitter on the sensor body. The sensor transmitter or receiver includes an antenna with its axis tilted with respect to the axis of the downhole tool. A sensor includes a tri-axial system of antennas. Another sensor includes a cross-dipole antenna system.

14 Claims, 12 Drawing Sheets

SUBSURFACE ELECTROMAGNETIC MEASUREMENTS USING CROSS-MAGNETIC DIPOLES

BACKGROUND OF INVENTION

1. Field of the Invention

The invention relates generally to the field of subsurface exploration. More particularly, the invention relates to techniques in which instruments equipped with antenna systems having cross-magnetic dipoles are used for improved subsurface electromagnetic measurements and imaging.

2. Background Art

Electromagnetic (EM) induction and propagation logging techniques are well known in the field of hydrocarbon exploration and production. A typical EM logging tool comprises a transmitter antenna and one or more (typically a pair) receiver antennas disposed at a distance from the transmitter antenna along the axis of the tool. The tools are disposed within a subsurface formation that has been penetrated by a borehole to measure the electrical conductivity (or its inverse, resistivity) of the formation. EM energy emitted from the transmitter interacts with the borehole fluid ("mud") and surrounding formation to produce signals that are then detected and measured by the receiver(s). By processing the detected signal data using inversion algorithms and models well known in the art, a profile of the borehole or formation properties is obtained.

Geologists and petrophysicists historically have found it necessary to visually analyze full well cores extracted from zones of interest to assess complex or thinly laminated (also referred to as bedded) reservoirs and aid in the discovery of hydrocarbons. High resolution "microresistivity" measurement techniques have been developed over the years to contribute to the identification of hydrocarbons in low resistivity pay zones. High resolution measurements have helped improve the estimation of reserves in such reservoirs.

Microresistivity tools have been developed for wireline and while-drilling applications. Examples of wireline microresistivity tools include the Formation MicroScanner™ tool and the Fullbore Formation Microimager tool (FMI™) produced by Schlumberger. Logging-while-drilling (LWD) EM tools capable of providing subsurface images are described in U.S. Pat. No. 5,235,285. The '285 patent describes an LWD tool that can measure the resistivity at the bit. Examples of tools based on this and related principles include the RAB™ (resistivity at the bit) and GVR™ (geovision resistivity) tools produced by Schlumberger. These tools are capable of providing borehole resistivity images of the reservoir rock being drilled.

Early microresistivity techniques were implemented for use with conductive muds, usually a mixture of salt water and weighting solids to control mud density. These EM tools have been designed to investigate the formation beyond the invaded zone present when the well is drilled with a water-base mud. More and more new wells are now being drilled with oil-based mud (OBM) containing chemical additives that build and leave a thin impermeable mudcake and usually prevent significant invasion into the permeable zones around the borehole. Synthetic-based muds have also been introduced in the industry. Early microresistivty tools were based on low frequency electrode devices that are not very suitable for wells drilled with OBM.

Conventional logging tools have been developed to provide subsurface images in wells drilled with OBM. U.S. Pat. Nos. 3,973,181, 6,191,588, and 6,600,321 describe tools capable of imaging operations in OBM. While progress has been made in the development of wireline OBM tools, the development of EM tools suitable for while-drilling operations in OBM has been relatively slower. A need remains for improved EM imaging and logging techniques, particularly in while-drilling applications using OBMs.

SUMMARY OF INVENTION

The invention provides a tool for determining subsurface properties. The tool comprises an elongated body having a longitudinal axis and adapted for disposal within a subsurface borehole. A transmitter is disposed on the body and adapted to transmit electromagnetic energy. A receiver is also disposed on the body at a distance less than six inches (15 cm) from the transmitter and adapted to receive electromagnetic energy. The transmitter or receiver comprises at least one antenna with its axis tilted with respect to the longitudinal body axis.

The invention provides a method for determining subsurface properties using a tool adapted for disposal within a borehole traversing an earth formation, the tool having an elongated body with a longitudinal axis and including a transmitter and a receiver disposed thereon, the receiver located at a distance less than six inches (15 cm) from the transmitter, the transmitter or receiver comprising at least one antenna with its axis tilted with respect to the tool axis. The method comprises disposing the tool within the borehole; energizing the transmitter to emit electromagnetic energy; acquiring a subsurface electromagnetic measurement using the receiver; and determining a subsurface property using the electromagnetic measurement.

Other aspects and advantages of the invention will be apparent from the following description and the appended claims.

DETAILED DESCRIPTION

EM logging sensors may be based on electrical dipoles (using metallic electrodes) or magnetic dipoles (using antennas or resonant cavities at VHF). Embodiments of the present invention relate to magnetic dipole sensors for subsurface imaging, the detection of boundaries, faults, fractures, dipping planes, and the determination of borehole wall distances. As used herein, "sensors" is understood to include an EM transmitter-receiver system. A co-pending application Ser. No. 10/674,179, filed on Sep. 29, 2003, entitled "*Apparatus and Methods for Imaging Wells Drilled with Oil-Based Muds*," by Tabanou et al. and assigned to the present assignee, discloses tools and methods based on electrical dipole sensors for resistivity measurements in wells drilled with OBM.

Conventional EM transmitters and receivers consist of coil or loop antennas mounted on a support. A coil carrying a current can be represented as a magnetic dipole having a magnetic moment proportional to the current and the area encompassed by the coil. The direction and strength of the magnetic dipole moment can be represented by a vector perpendicular to the area encompassed by the coil. Typical downhole tools are equipped with coils of the cylindrical solenoid type comprised of one or more turns of insulated conductor wire. Those skilled in the art will appreciate that the same antenna may be used as a transmitter at one time and as a receiver at another. It will also be appreciated that the transmitter-receiver configurations disclosed herein are interchangeable due to the principle of reciprocity, i.e., the "transmitter" may be used as a "receiver", and vice-versa. Embodiments of the invention are suitable for operation at high frequencies (e.g. 1-500 MHz, preferably 2-100 MHz, and most preferably around 50 MHz) and comprise short spacing antenna arrays (e.g. transmitter-receiver spacing on the order of 1 inch [2.54 cm]).

High frequency operation together with short array spacings makes the sensors of the invention capable of providing high-resolution images of near borehole regions. Embodiments of the invention take advantage of mud invasion to provide a sensitive means for detecting geophysical variations. Mud invasion provides a relatively uniform background (with respect to resistivity) in the invaded zone; the relatively uniform background makes the detection of small variations easier. Thus, while mud invasion presents a problem in conventional logging operations, which attempt to derive "absolute" formation resistivities, it facilitates sensitive, high-resolution well imaging in accordance with embodiments of the invention, making use of "relative" resistivities.

Figure 1:
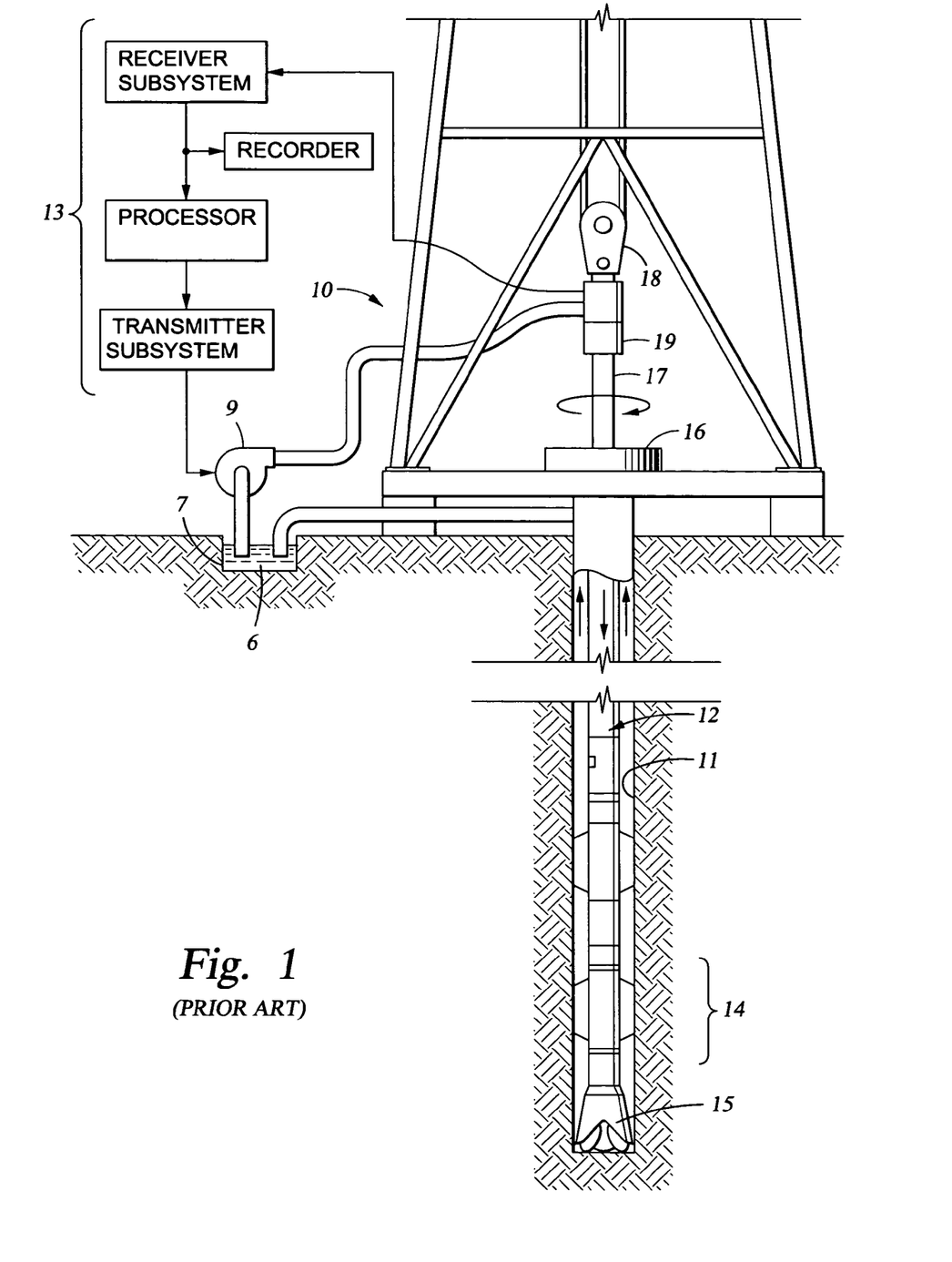
FIG. 1 shows a prior art logging-while-drilling system.

FIG. 1 shows a typical LWD system that includes a derrick 10 positioned over a borehole 11. A drilling tool assembly, which includes a drill string 12 and drill bit 15, is disposed in the borehole 11. The drill string 12 and bit 15 are turned by rotation of a kelly 17 coupled to the upper end of the drill string 12. The kelly 17 is rotated by engagement with a rotary table 16 or the like forming part of the rig 10. The kelly 17 and drill string 12 are suspended by a hook 18 coupled to the kelly 17 by a rotatable swivel 19. Drilling fluid 6 is stored in a pit 7 and is pumped through the center of the drill string 12 by a mud pump 9 to flow downwardly. After circulation through the bit 15, the drilling fluid circulates upwardly through an annular space between the borehole 11 and the outside of the drill string 12. Flow of the drilling mud 6 lubricates and cools the bit 15 and lifts drill cuttings made by the bit 15 to the surface for collection and disposal. As shown, a logging tool 14 is connected to the drill string 12. Signals measured by the logging tool 14 may be transmitted to the surface computer system 13 or stored in memory (not shown) onboard the tool 14. The logging tool 14 may include one or more sensors of the present invention as described herein.

Figure 2:
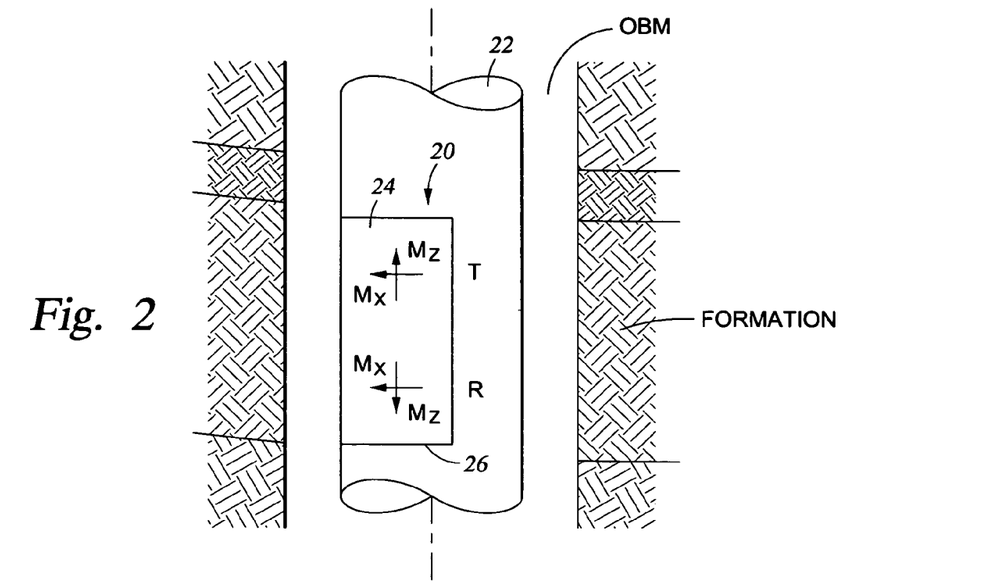
FIG. 2 shows a sensor embodiment in accord with the invention.

Sensors in accordance with embodiments of the invention are designed to provide EM measurements under a wide range of conditions. FIG. 2 shows a sensor 20 embodiment of the invention disposed in a downhole tool 22. The sensor 20 comprises a crossed magnetic dipole transmitter T and receiver R. The transmitter T comprises two antennas arranged in orthogonal directions such that their magnetic moments are aligned in the longitudinal ($M_z$) and transverse direction ($M_x$). The receiver R also comprises two antennas arranged in the same orthogonal directions such that their magnetic moments are aligned in the same longitudinal and transverse direction ($M_z$ and $M_x$). With this sensor, each of the two transmitter antennas may be combined with each of the two receiver antennas to provide four arrays to measure multiple EM couplings. These measurements provide the capability to determine formation dips, faults, bedding boundaries, borehole wall distances—even if the well is drilled with a resistive mud (e.g. OBM). The embodiment of FIG. 2 shows the sensor 20 embedded in a suitable insulating material 24 (e.g. high temperature fiberglass composite thermal set or thermal plastic) disposed within a void or cavity 26 formed in the tool body 22.

Figure 3A:
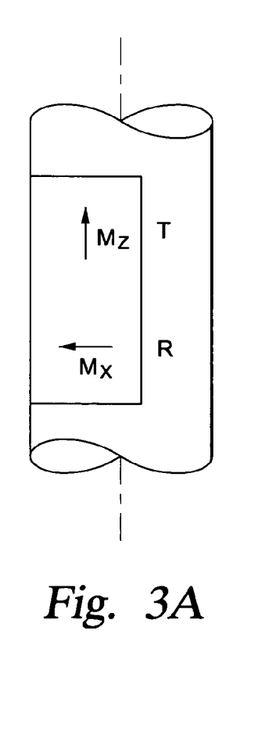
FIGS. 3A-3C illustrate various antenna arrays of the sensor in FIG. 2.
Figure 3B:
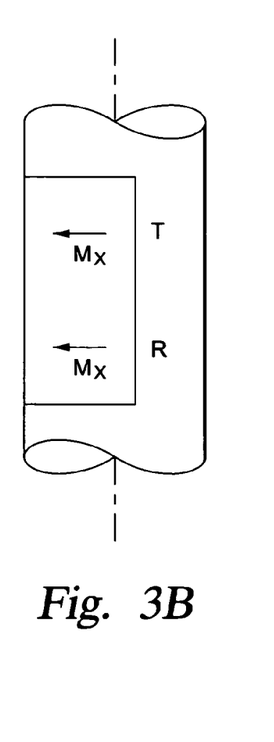
Figure 3C:
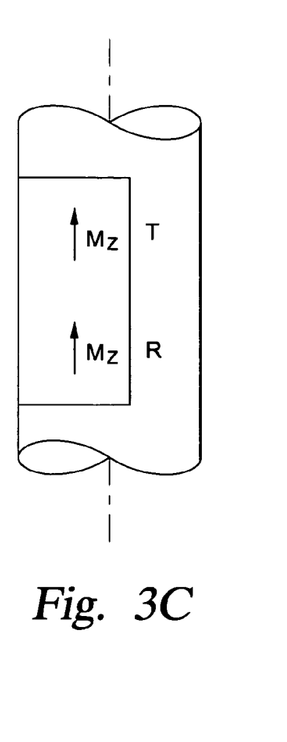

The operation of sensor 20 in FIG. 2 is best explained with each transmitter-receiver array separately. FIGS. 3A-3C illustrate three simple arrays that comprise components of the sensor 20. Each of these arrays may be used to provide specific measurements if desired, or combined to provide measurements for all-mud imaging.

Figure 11:
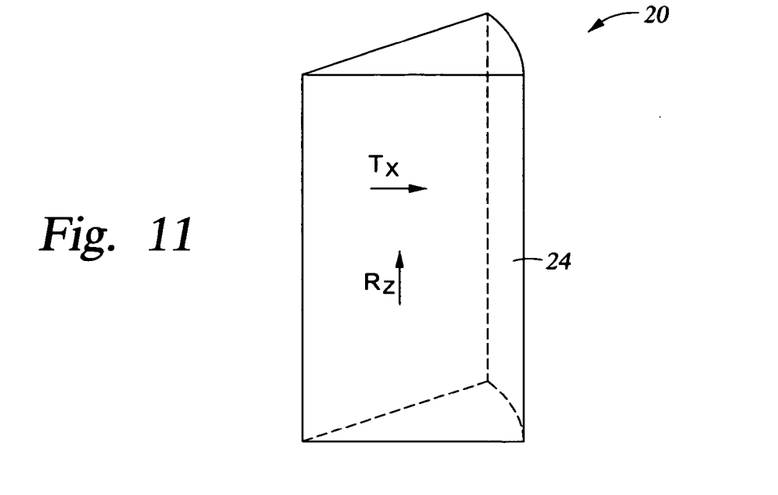
FIG. 11 shows a wedge-shaped sensor embodiment of the invention.

FIG. 3A shows a simple array in which the transmitter antenna T has a magnetic moment ($M_z$) substantially aligned with the direction of the longitudinal axis of the tool (represented by a dashed line), while the receiver antenna R has a magnetic moment ($M_x$) substantially perpendicular to the longitudinal axis of the tool. The reciprocal array configuration is shown in FIG. 11. The cross-dipole measurements (i.e. $V_{xz} \pm V_{zx}$) obtained with this sensor array provide useful information suitable for OBM imaging. Since typical formations have sedimentation layers with different resistivities, this sensor array will detect a signal at a bedding boundary.

Conventional $V_{xz}$ or $V_{zx}$ measurements are generally insensitive to bed boundaries in vertical holes, but they are sensitive to standoff and invasion. $V_{xz} - V_{zx}$ becomes sensitive to boundaries in vertical holes, but the response is still dominated by standoff and invasion. On the other hand, $V_{xz}+V_{zx}$ is less sensitive to standoff and reads zero if there is no boundary between the transmitter and receiver.

Measurement of $V_{zx}+V_{xz}$ allows one to detect horizontal bed boundaries. Measurement of $V_{zx}-V_{xz}$ allows for the determination of the distance between the sensor array and the borehole wall. The magnitude of the sensor signal is more pronounced in formations with relative dips or faults. Thus, this array is particularly suited for imaging bed boundaries in formations with dipping planes. Further, a null reading of this array can be used to confirm the absence of a bed boundary or dipping planes in the measurements obtained using other arrays.

FIG. 3B shows a simple array having the transmitter antenna T and the receiver antenna R aligned in the same direction such that their magnetic moments ($M_x$ and $M_x$) are substantially perpendicular to the longitudinal axis of the tool. This array provides $V_{xx}$ measurements suitable for horizontal bed boundary and dip detection. With this array, the eddy currents are induced in planes parallel to the longitudinal axis of the tool. That is, the eddy currents flow up and down the formations in a vertical well (i.e. across sedimentation layers). When a bed boundary is crossed, the measurement made with this array will produce a discernable response. This is due to the current density discontinuity at the boundary between beds. The sensor will be sensitive to resistivity differences in sedimentation layers when it is moved across a boundary, i.e., the sensitivity region is determined by the transmitter-receiver spacing. Embodiments of the invention can have array spacings on the order of 2 inches (5 cm) or less, preferably around 1 inch (2.54 cm) or less. This array configuration is sensitive to bed boundaries regardless of the presence or absence of dipping planes, provided the adjacent beds exhibit differing resistivities. The magnitudes of the signals detected by the sensor 20 correspond to the conductivity ratio of adjacent beds.

FIG. 3C shows an array having the transmitter antenna T and the receiver antenna R aligned in the same longitudinal direction such that they both have longitudinal magnetic moments ($M_z$, $M_z$). This array provides $V_{zz}$ measurements similar to a conventional EM logging tool and induces eddy currents to flow in loops perpendicular to the longitudinal axis of the tool. This configuration provides the formation resistivity around the borehole. Due to the short investigation zone of this array, the resistivity measurements derived from these readings are primarily affected by the invasion.

As described above, each array provides useful information in different situations. The combination of measurements from the arrays enables the sensor 20 to provide useful information in a wide range of wellbore conditions, mud types, and orientations. The four simple magnetic dipoles of the sensor 20 provide four measurements that may be represented as a voltage matrix V of the form:

$$V = \begin{pmatrix} v_{xx} & v_{xz} \\ v_{zx} & v_{zz} \end{pmatrix}.$$

In this notation, the array shown in FIG. 3A provides the $v_{xx}$ component, which is similar to the $v_{xz}$ component that would be provided by a similar array having a transverse transmitter and a longitudinal receiver. The arrays shown in FIG. 3B and FIG. 3C respectively provide the $v_{xx}$ and $v_{zz}$ components. The $v_{xx}$ component is sensitive to bed boundaries, regardless of the presence or absence of dipping planes, while $v_{zz}$ is primarily sensitive to invasion resistivity ($R_{xo}$). By having these four magnetic dipoles, the sensor 20 can provide high resolution images of wells as well as information on faults, fractures, or dipping planes, and flushed zone resistivity.

Note that the four measurements at a single borehole location (vertical depth) may be acquired by selectively energizing the transmitters in the arrays and recording the detected receiver signals (time multiplexing). An alternative approach is to energize two or more transmitters at different frequencies such that the detector signals can be differentiated based on frequency (frequency multiplexing). Note that it is also possible to combine the use of time and frequency multiplexing in a single operation. Rotation of a tool (e.g. in LWD) including the sensor 20 provides azimuthal imaging measurements.

The mathematical theory underlying the cross-dipole (e.g. transmitter T and receiver R of FIG. 3A) measurements of the invention is now presented. For a transmitter carrying a current I, the voltage V measured at the receiver can be expressed in terms of a tensor transfer impedance $$\vec{Z}_{RT}:$$

$$V = I u_R \cdot \vec{Z}_{RT} \cdot u_T. \tag{1}$$

The transmitter antenna has a magnetic dipole moment oriented along the unit vector $u_T$; the receiver antenna is oriented along $u_R$. The transfer impedance $$\vec{Z}_{RT}$$

has the following symmetry property $$\vec{Z}_{RT} = \vec{Z}_{RT}^T, \tag{2}$$

where the superscript $^T$ denotes the transpose tensor.

Two sets of orthogonal unit vectors are introduced, $u_x$, $u_y$, $u_z$ for the formation, and $u_X$, $u_Y$, $u_Z$ for the tool coordinates, with $u_Z$ along the axis of symmetry of the tool. The z axis is perpendicular to the layers, oriented upward. The tool axis is in the x-z plane. The dip angle is denoted by $\alpha$, so that $u_X = u_x \cos \alpha + u_z \sin \alpha,$ $u_Y = u_y,$ $u_Z = -u_x \sin \alpha + u_z \cos \alpha. \tag{3}$ The symmetrized cross-dipole measurement in the tool coordinates can be transformed to formation coordinates as follows:

$$V_{ZX} - V_{XZ} = Iu_Z \cdot \vec{Z}_{RT} \cdot u_X - Iu_X \cdot \vec{Z}_{RT} \cdot u_z \quad (4)$$

$$= I(-u_x\sin\alpha + u_z\cos\alpha) \cdot \vec{Z}_{RT} \cdot (u_x\cos\alpha + u_z\sin\alpha) -$$

$$I(u_x\cos\alpha + u_z\sin\alpha) \cdot \vec{Z}_{RT} \cdot (-u_x\sin\alpha + u_z\cos\alpha)$$

$$= I(\cos^2\alpha + \sin^2\alpha)\left(u_z \cdot \vec{Z}_{RT} \cdot u_x - u_x \cdot \vec{Z}_{RT} \cdot u_z\right) \quad (5)$$

$$= I\left(u_z \cdot \vec{Z}_{RT} \cdot u_x - u_x \cdot \vec{Z}_{RT} \cdot u_z\right)$$

$$= V_{zx} - V_{xz}. \quad (6)$$

We get the same result in the tool coordinates as in the formation coordinates. It can be concluded that this measurement is insensitive to relative dip and anisotropy, since the coupling $V_{zx}-V_{xz}$ is insensitive to it.

Figure 4:
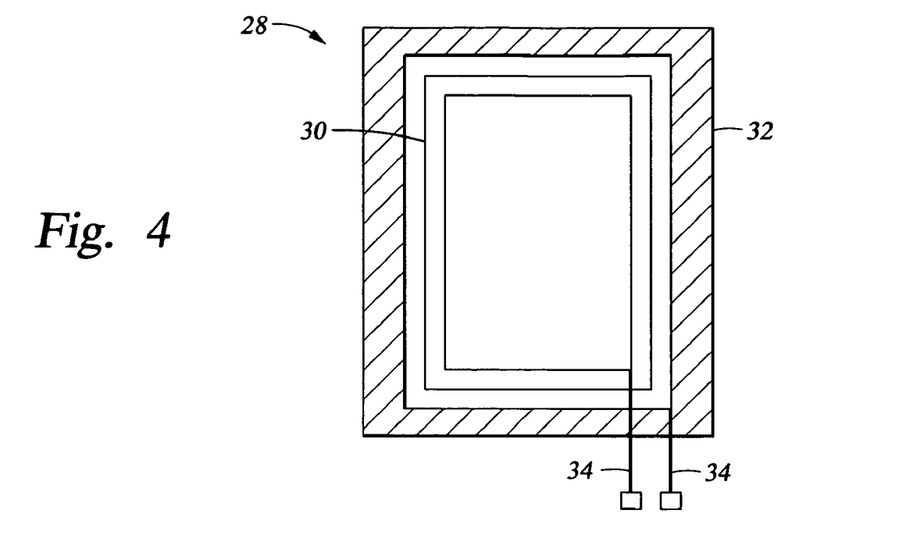
FIG. 4 shows a sensor antenna constructed on an insulating sheet in accord with the invention.

The transmitter and receiver antennas of the invention are miniaturized in comparison to conventional sensors. As such, these sensors may be implemented on a printed circuit board (PCB). FIG. 4 shows a sensor antenna 28 embodiment of the invention. In this embodiment, a coil 30 is disposed on an insulating sheet 32 according to the desired pattern to form a flexible circuit. The coil(s) 30 may be formed from any suitable electrical conductor, including wire or metallic foil. Adhesives (e.g. polyimides, epoxies, and acrylics) may be used to bond the conductor to the insulating sheet. Alternatively, the coils may be formed by the deposition of conductive films on the insulating sheet as known in the art. Conductors 34 provide the corresponding electrical connection for energizing the coil 30.

The insulating sheet can be any electrically nonconductive or dielectric film substrate, such as polyimide film or a polyester film having a thickness selected to enable bending or flexing as desired. Methods used to produce the insulating sheet are described in U.S. Pat. No. 6,208,031, incorporated herein by reference. Additional antenna configurations that may be used to implement the sensors of the invention are described in U.S. Pat. No. 6,690,170, incorporated herein by reference.

Figure 5:
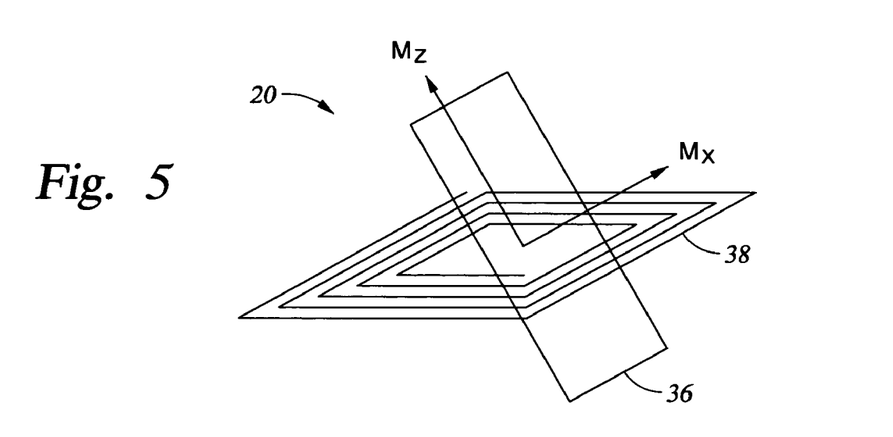
FIG. 5 shows a cross-dipole sensor embodiment of the invention.
Figure 6:
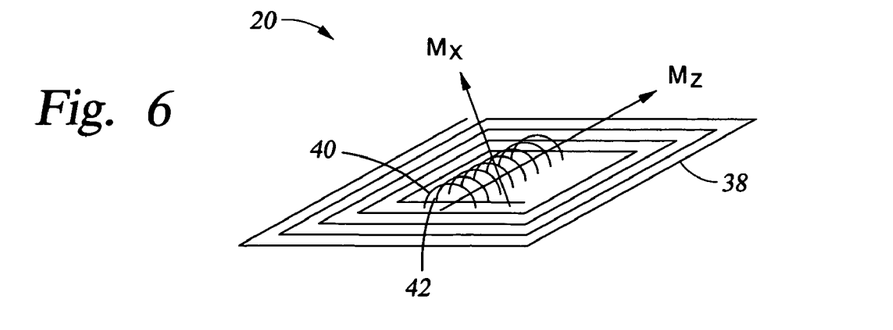
FIG. 6 shows another cross-dipole sensor embodiment of the invention.

FIG. 5 shows an embodiment of a crossed-dipole sensor 20 of the invention. The sensor includes two antennas 36, 38 formed on insulating sheets, with their magnetic moments ($M_z$, $M_x$) having a common intersection. As noted above, the sensors of the invention may be operated as transmitters and/or receivers as desired. FIG. 6 shows another sensor 20 embodiment of the invention. This sensor 20 comprises an antenna 38 configured similar to that in FIG. 5 and another antenna 40 configured on a core or "bobbin" 42 as described in U.S. Pat. No. 6,690,170. The magnetic moments ($M_z$, $M_x$) of this embodiment have a common intersection and are orthoganol to one another.

Those skilled in the art will appreciate that the sensor arrays of the invention may also include bucking antennas to reduce or eliminate mutual couplings between the transmitters and the receivers. The use of bucking antennas is well known in the art. In one technique, the receiver's output is set to zero by varying the axial distance between the transmitter or receiver and the bucking antenna. This calibration method is usually known as mutual balancing. U.S. Pat. No. 6,690,170 describes mutual balancing configurations that may be implemented with the invention.

Figure 7:
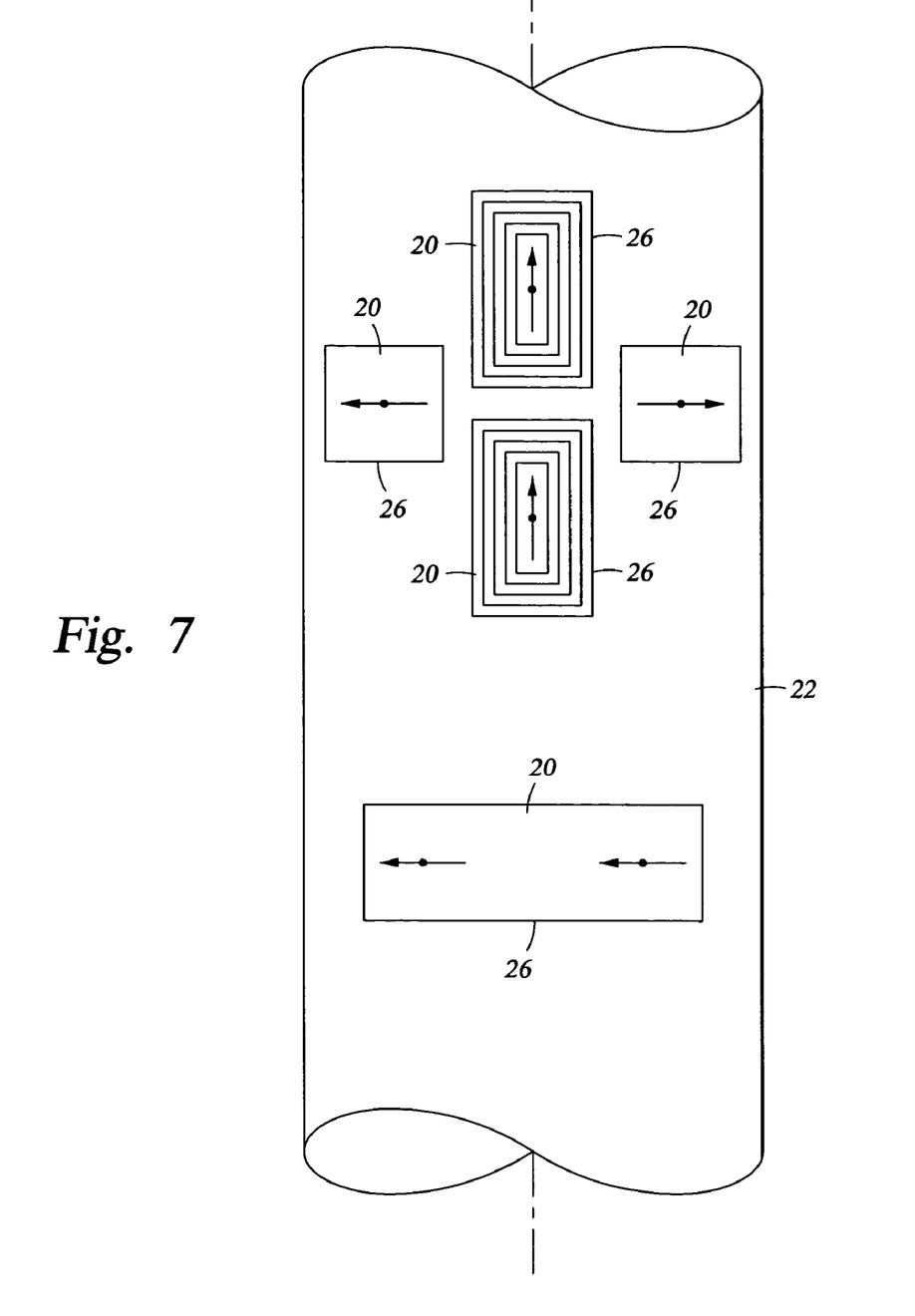
FIG. 7 shows a downhole tubular incorporating multiple sensor embodiments of the invention.

FIG. 7 shows another embodiment of the invention. A downhole tool consisting of a metallic tubular 22 (e.g. a drill collar) comprises several sensors 20 of the invention disposed in respective cavities 26 formed in the tubular. The sensors 20 may be disposed on the tubular 22 in various alignments and with differently oriented magnetic dipoles to provide measurements under many borehole conditions. For example, this embodiment is suitable for use in vertical as well as horizontal boreholes. Although the sensor magnetic dipoles are not labeled for clarity of illustration, it will be understood that the transverse-oriented dipoles are represented as dots extending into or out of the page.

Figures 8, 9:
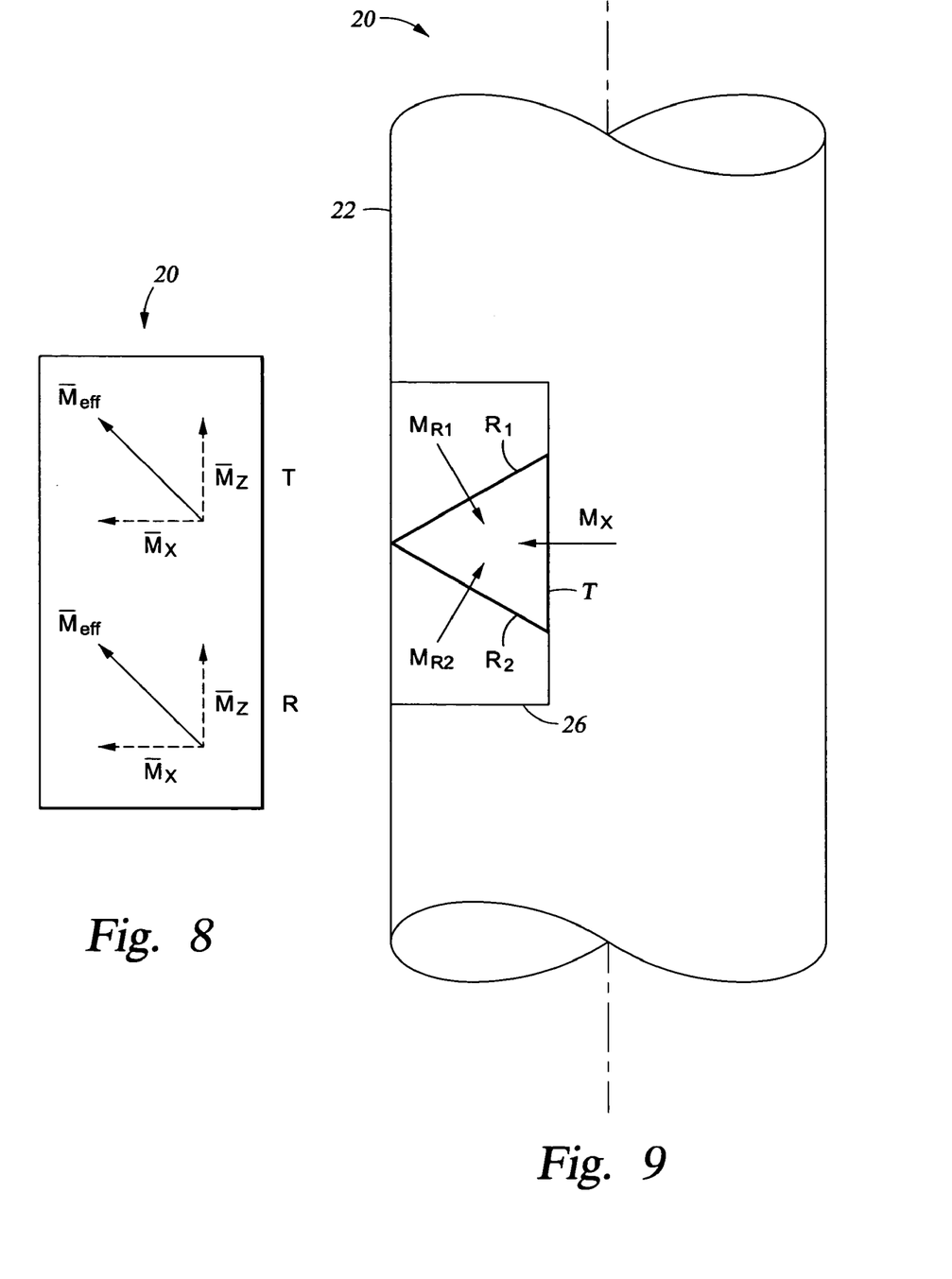
FIG. 8 shows a side view of the vector components and effective magnetic moment of a sensor embodiment of the invention.
FIG. 9 is a schematic diagram of a downhole tubular incorporating a sensor embodiment of the invention.

Note that FIG. 2 illustrates one embodiment of the invention. The transmitter and receiver antennas in this embodiment are arranged in substantially orthogonal directions. Those skilled in the art will appreciate that other embodiments may be implemented. For example, the sensor 20 antennas need not be arranged in orthogonal directions. Instead, one or more of the longitudinal or transverse antennas may be replaced with a tilted antenna, which is an antenna having a magnetic moment not parallel to or perpendicular to the longitudinal axis of the tool. FIG. 8 illustrates the vector components of another sensor 20 embodiment of the invention comprising a tilted transmitter antenna T and a tilted receiver antenna R. The tilted antennas provide measurements that include longitudinal $\overline{M_z}$ and transverse $\overline{M_x}$ components, which may be separated in analysis.

FIG. 9 shows a side view of another sensor 20 embodiment of the invention. The sensor 20 is disposed in a tubular 22 and includes two tilted receiver antennas $R_1$ and $R_2$ (magnetic moments shown as $M_{R1}$ and $M_{R2}$) and a transmitter antenna T (magnetic moment shown as $M_x$). The transmitter T and receivers $R_1$ and $R_2$ of this sensor are arranged to yield a complex voltage measurement that is proportional to the conductivity (or resistivity) of the borehole wall. Note that the transmitter antenna T and the two receiver antennas $R_1$, $R_2$ lie on three planes that form a triangle in this view.

In accordance with the sensor embodiments of the invention, the transmitter T is operable at relatively high frequencies, in a range of 1-500 MHz, preferably between 2 and 100 MHz, and more preferably around 50 MHz. The dimensions of the sensor 20 are preferably small to provide high resolution images. For example, in one embodiment the distances between the center of the transmitter antenna T and the centers of the receiver antennas $R_1$, $R_2$ are on the order of 2 inches (5 cm) or less, more preferably on the order of 1 inch (2.54 cm) or less. In some embodiments, the two receiver antennas $R_1$ and $R_2$ are connected in series such that their signals are summed during data acquisition. In other embodiments, the two receiver antennas $R_1$ and $R_2$ are independent, and the signals acquired by these receivers may be combined in the analysis if desired.

As shown in FIG. 9, the magnetic moments of the receivers $R_1$, $R_2$ are arranged at angles relative to the magnetic moment of the transmitter T. If both receivers are tilted at the same angle relative to the transmitter (i.e. forming an isosceles triangle in the side view of FIG. 9), then the summation of the receiver magnetic moments ($M_{R1}$ and $M_{R2}$) results in a moment that is in the same direction as the transmitter magnetic moment ($M_x$). In this configuration, the sensor is operable similar to a transverse transmitter-transverse receiver array (e.g. FIG. 3B), making the sensor sensitive to bed boundaries. With its tilted receiver antennas, this sensor is sensitive to dipping planes, faults, or fractures, particularly if the signals from the two receivers are separately processed.

While the sensor 20 shown in FIG. 9 has the two receiver antennas $R_1$, $R_2$ arranged at the same angle relative to the transmitter antenna T, one skilled in the art will appreciate that other arrangements are possible. For example, if the two receivers are arranged at different angles relative to the transmitter (i.e. forming a non-isosceles triangle in the side view of FIG. 9), then the summation of the two receiver magnetic moments is equivalent to a magnetic moment of a tilted antenna. In this case, the signals from the "tilted" antenna can be decomposed into the longitudinal and the transverse components.

Figure 10:
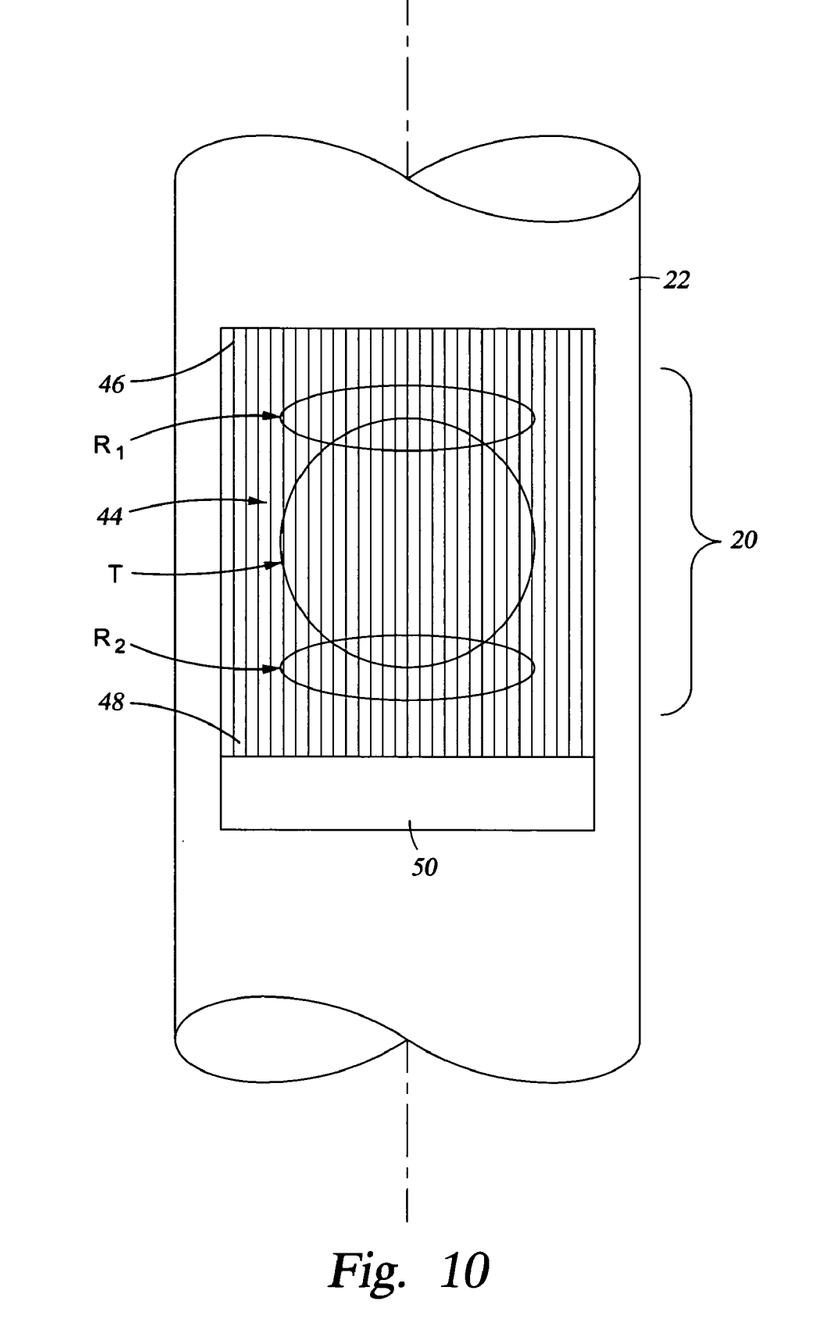
FIG. 10 is a front-view schematic of the sensor configuration of FIG. 9 including a shielding mechanism in accord with the invention.

FIG. 10 shows the sensor 20 arrangement of FIG. 9 projected behind a Faraday shield 44. The shield 44 includes multiple conductive metal strips (fingers) 46 interspersed with multiple insulating strips (fingers) 48 to minimize current loops in a conductive tool body 22. A conductor 50 (e.g. a metallic strip) couples the metal strips 46 at one end. U.S. Pat. Nos. 6,667,620 and 6,557,794 (both incorporated herein by reference) describe current-directing shields that may be used to implement the present invention.

The sensors of the invention are not limited to use in any particular type of subsurface measurement or exploration operation. They may be disposed within a borehole on any type of support member (e.g. on coiled tubing, drill collars, casing, wireline tools). FIG. 11 shows another sensor 20 embodiment of the invention. This sensor 20 consists of a transverse transmitter $T_x$ antenna and a longitudinal receiver $R_z$ antenna disposed in insulating material (e.g. high temperature fiberglass composite thermal set or thermal plastic) 24 configured in a wedge shape.

Figure 12:
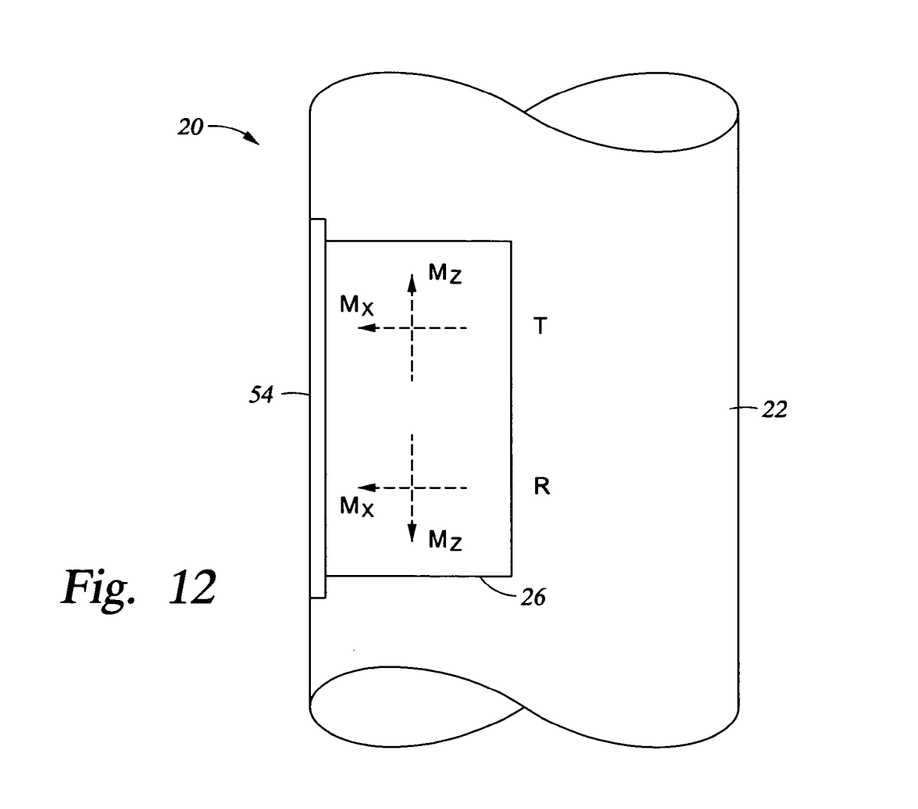
FIG. 12 shows a cross-section of a wedge-shaped sensor of the invention disposed within a cavity in a tubular and including a protective shield for downhole use.

FIG. 12 shows a side view of a sensor 20, similar to the embodiment of FIG. 11, disposed in a drill collar 22 within a correspondingly shaped cavity 26. This sensor 20 is configured with a transmitter and receiver including four magnetic dipoles, similar to the embodiment of FIG. 2. When implemented for LWD operations, a suitable shield 54 may be placed over the sensor to protect it from the harsh environment. Embodiments of the invention may be implemented with metallic shields having slots filled with an insulating material and arranged in appropriate patterns as known in the art to prevent the induction of eddy currents on the shield. U.S. Pat. Nos. 6,566,881 and 6,297,639 (both incorporated herein by reference) describe shield configurations that may be used to implement the present invention. Some embodiments may also be implemented with non-metallic shields (e.g. ceramic, Kevlar™, or PEEK™).

Figure 13:
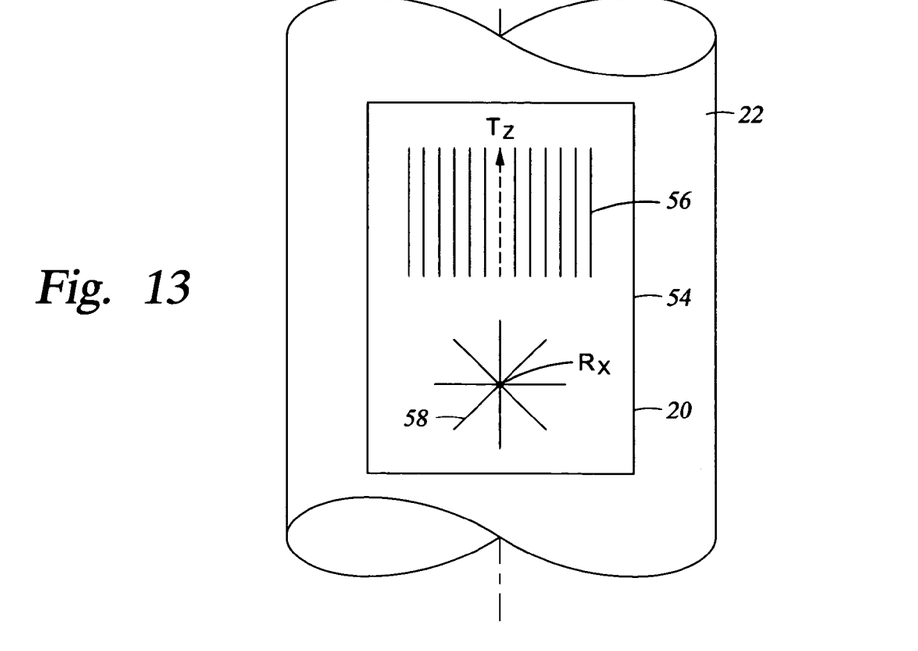
FIG. 13 is a schematic diagram of shielding mechanism disposed on a tubular to cover a sensor of the invention.

FIG. 13 shows another embodiment of the invention including a metallic shield 54 disposed over a sensor 20 of the invention disposed in a tubular 22. The magnetic dipole configuration (shown projected behind the shield) of the sensor 20 is similar to that of FIG. 3A. The shield 54 is configured with a series of longitudinal slots 56 to cover the longitudinal transmitter magnetic dipole ($T_z$) and angled slots 58 to cover the transverse receiver magnetic dipole ($R_x$) to provide EM filtering. The shield 54 may be affixed over the sensor using any suitable means known in the art.

Figure 14:
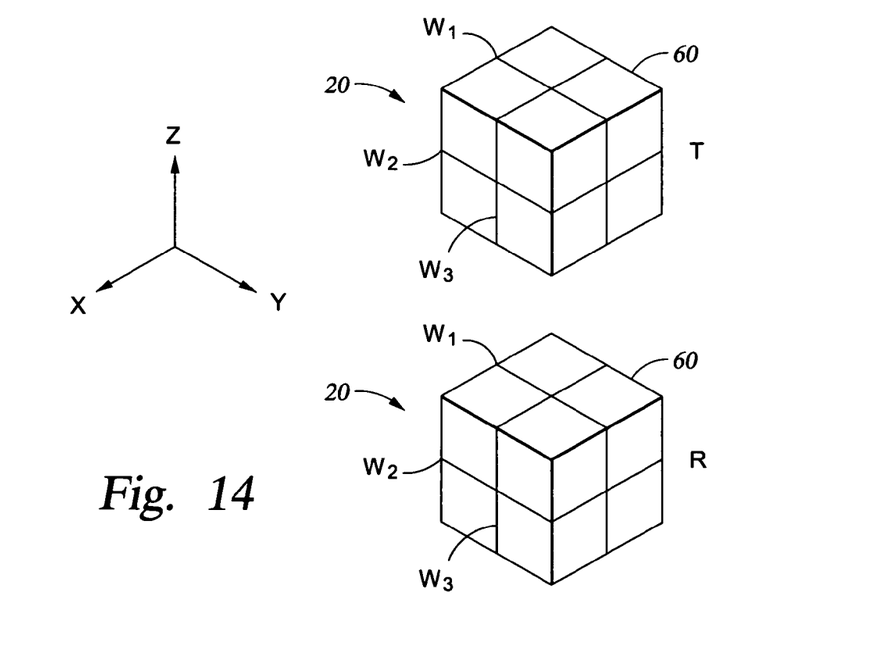
FIG. 14 is a schematic diagram of a pair of sensors adapted for tri-axial measurements in accord with the invention.

FIG. 14 shows other sensor 20 embodiments of the invention. A series of conductive windings $W_1$, $W_2$, $W_3$ are disposed on the faces of a cube 60 to form a sensor with three orthogonally-oriented magnetic dipoles, commonly referred to as a tri-axial antenna system. FIG. 14 shows a tri-axial transmitter T and receiver R. The cubes 60 are formed of a suitable insulating material (e.g. ceramic) and the windings may be disposed within grooves (not shown) on the cube surfaces. As known in the art, tri-axial EM antennas may be used for specifically targeted measurements and various analysis techniques may be used to derive desired parameters (See e.g., U.S. Pat. Nos. 6,584,408, 6,556,015). The cubes 60 are miniaturized (e.g. ¼"×¼"×¼" [$0.635^{cm}$×$0.635^{cm}$×$0.635^{cm}$]) and may be displaced on a tubular (not shown) in very close proximity to one another for the desired imaging measurements. Wiring and electronics for the sensors 20 may be disposed in a tubular using techniques known in the art (e.g. via feedthroughs).

Figure 15:
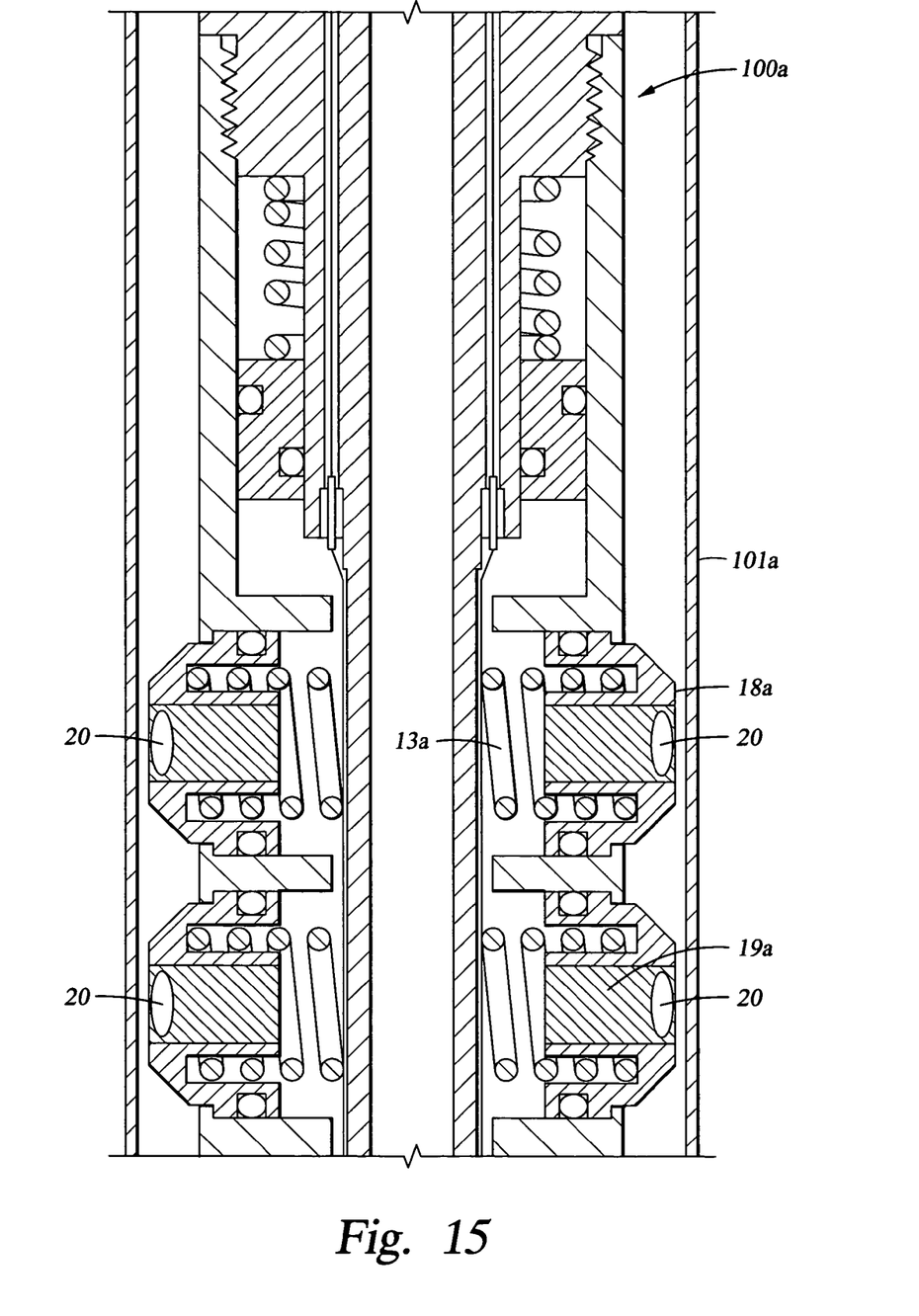
FIG. 15 shows a logging-while-drilling tool having extendable pistons that include sensors in accord with an embodiment of the invention.
Figure 16A:
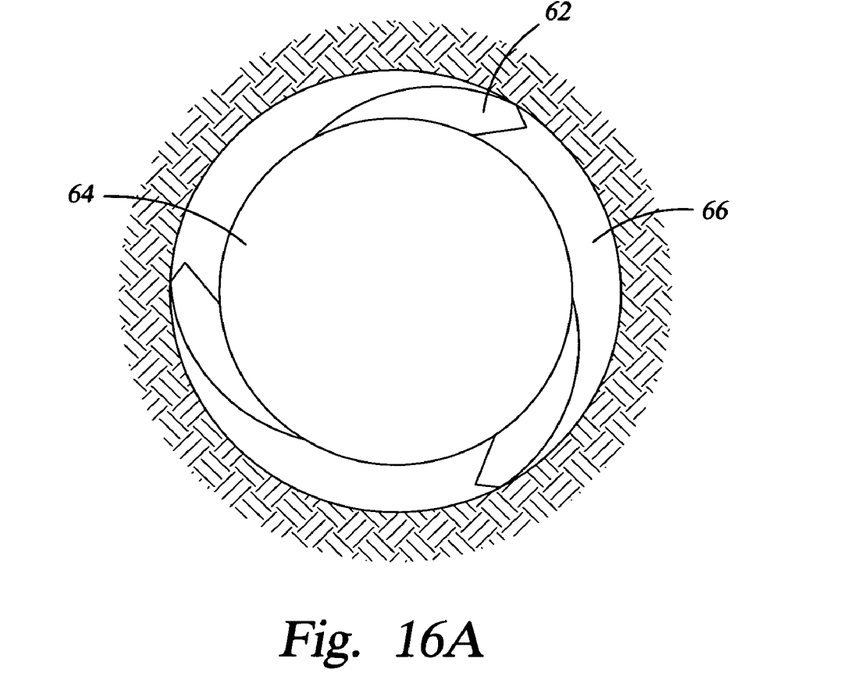
FIG. 16A shows a cross-sectional view of a Power-Drive™ tool drilling a borehole.
Figure 16B:
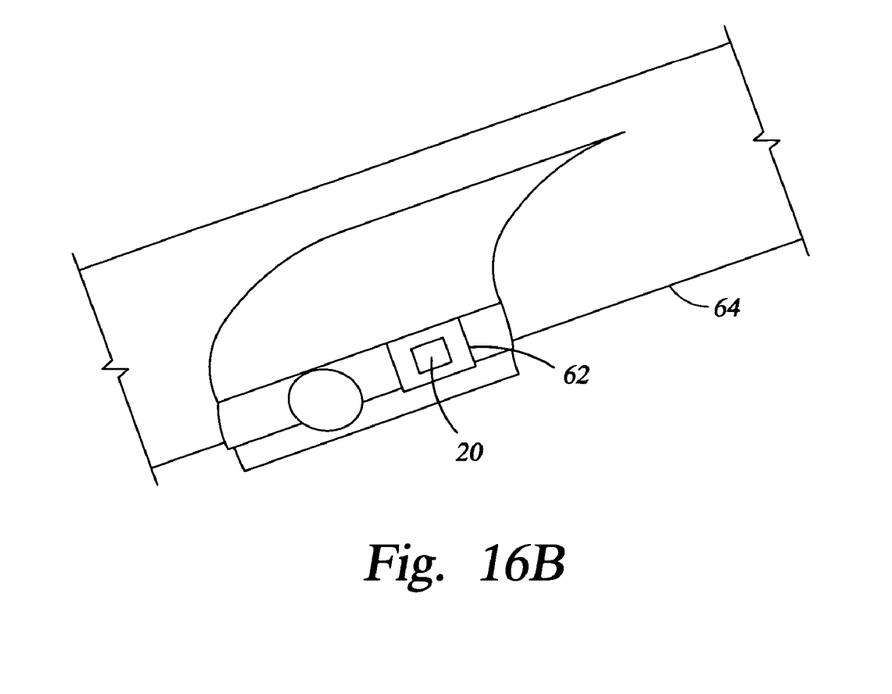
FIG. 16B shows a sensor embodiment of the invention disposed on a deployable pad of a PowerDrive™ tool.

As noted herein, a sensor 20 of the invention is relatively insensitive to tool standoff effects. If desirable, the tool standoff effects can be further minimized by deploying the sensor(s) on articulating or extendable devices on the tool body. Deployable pads have been extensively used in wireline tools to minimize tool standoffs and to maximize and maintain sensor contact with the borehole wall. FIGS. 15 and 16 show two embodiments of the invention incorporating the sensors 20 on logging tools equipped with articulating or extendable devices.

Co-pending U.S. patent application Ser. No. 10/605,200, filed on Sep. 15, 2003, by Homan et al. (incorporated herein by reference) discloses pressure-compensated pistons for use in while-drilling tools. FIG. 15 shows a tool 100a having four extendable pistons 18a as described in this co-pending application. The extendable pistons 18a are pressure-compensated, by having fluid-filled reservoirs 13a that are kept at a pressure substantially identical to the pressure outside the tool (e.g. the pressure in a borehole 101a). The extendable pistons 18a may be deployed, for example, by a bias force from springs behind the pistons. Each extendable piston 18a includes a pad 19a, which can house one or more sensors 20 of the present invention. The outer surface of the pad 19a is preferably hardened or "hardfaced" with a suitable material, as known in the art, to resist wear.

The use of deployable pads in while-drilling tools has been implemented in the PowerDrive™ tool produced by Schlumberger. FIG. 16A shows a cross-sectional view of a drill collar equipped with three PowerDrive™ pads 62 disposed on a PowerDrive™ tool 64 that is in the process of drilling a borehole 66.

FIG. 16B shows a sensor 20 embodiment of the invention disposed on one of the PowerDrive™ pads 62. Although this configuration is shown with a single sensor 20, other embodiments may be implemented with multiple sensor arrays. The deployable pads 62 may also include other types of sensors or sources for subsurface measurements as known in the art. By using the deployable pads, the sensors 20 can be kept in contact with the borehole wall to eliminate or minimize standoff effects.

Figure 17:
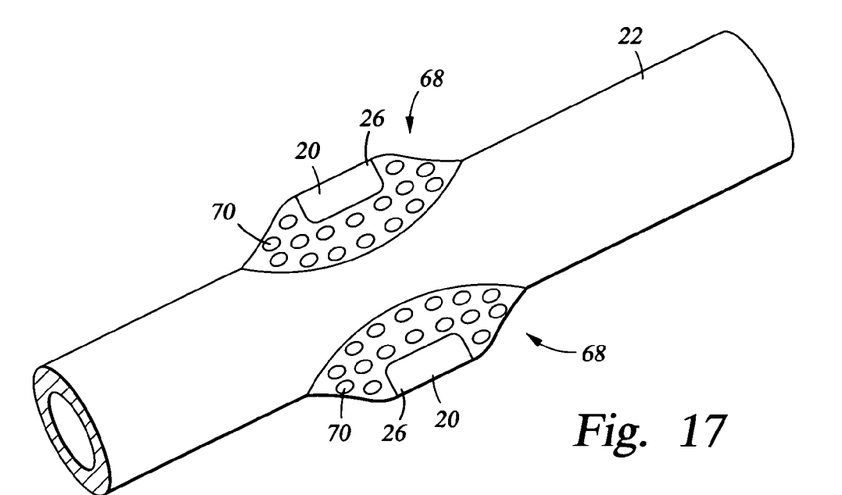
FIG. 17 shows a downhole tubular including a protruding section housing a sensor of the invention.

FIG. 17 shows another embodiment of the invention. A downhole tubular 22 (e.g. drill collar) is shown with a sensor 20 disposed within a sensor pocket or cavity 26 formed in a protruding section 68 of the tubular. The tubular 22 may be manufactured to include the protrusion 68 and cavity 26 as known in the art. Alternatively, the protrusion 68 may be formed on the tubular 22 by affixing a suitable material to its exterior wall (e.g. by welding or deposition of a hardened insert). The outer surface of the protrusion 68 is preferably hardfaced with a suitable material (e.g. with hardened metal inserts 70 ) to increase durability. This tubular 22, as well as other tool embodiments comprising the sensors 20 of the invention, is adapted with suitable wiring (e.g. via feedthroughs) coupled to conventional electronics as known in the art to activate the sensor (not shown). A downhole tubular 22 equipped with a cross-dipole sensor of the invention provides a recessed sensor for while-drilling applications, with no direct borehole contact required. Other embodiments may be implemented with a plurality of sensor-equipped protrusions 68 configured as desired (e.g. azimuthally or axially distributed about the tubular similar to FIG. 7).

The complex voltage measurement (V) obtained by a sensor 20 of the invention may be related to the conductivity in the formation and borehole by the following relationship:

$$V = k\sigma_{apparent}, \quad (7)$$

where $\sigma_{apparent}$ is the apparent conductivity and $\kappa$ is the sensor constant. The apparent conductivity, $\sigma_{apparent}$, and hence the measurement, depends on the formation conductivity $\sigma_f$ and the tool or sensor housing (e.g. pad) conductivity. Thus if the tool or pad conductivity remains substantially constant, then the "relative" resistivity measurements depend on the formation conductivity $\sigma_f$. Even if the sensor arrays are surrounded by materials that render the housing/tool conductivity temperature-dependent, the relationship shown in Equation (7) still holds. In this case, the relationship takes a slightly different form:

$$V = \kappa_1 \sigma_f - C(T), \quad (8)$$

where $\kappa$ is replaced by $\kappa_1$, a constant that takes into account the mechanical and material properties and antenna geometry. The constant $\kappa_1$ can be found empirically. The second term C(T) is a temperature-dependent term that does not change significantly within a short distance in a borehole.

Figure 18:
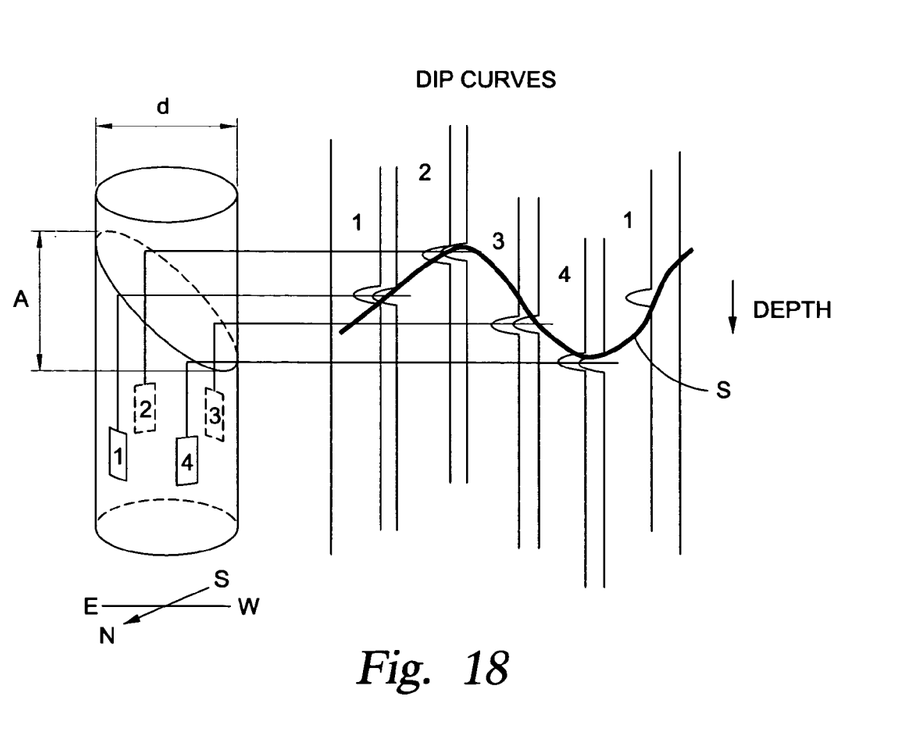
FIG. 18 illustrates a technique for finding a dip angle of a dipping plane using sensors in accord with the invention.

In addition to determining bed boundaries, fractures, and faults, embodiments of the invention may also provide information on dip angles of dipping planes and sensor-borehole wall distances. Embodiments of the invention may also be implemented with a tool equipped with multiple sensor arrays in configurations that provide measurements with azimuthal information (FIG. 18). Dip angles of dipping planes can be derived using the azimuthal information and depths of the bed boundaries by fitting a sinusoidal curve or using the following equation:

$$\Phi = \tan^{-1}\left(\frac{A}{d}\right), \quad (9)$$

where $\Phi$ is the dip angle, A is the amplitude of vertical extent of the bed boundary intercepting the borehole, and d is the borehole diameter. In FIG. 18, the dipping bed boundaries on the borehole wall versus the depth of four sensor arrays labeled 1 through 4 are shown. As illustrated in the borehole model, the dip plane intercepts the borehole to produce an oval interception curve. This oval curve shows up as points that define a sinusoidal curve (S) in a 2D pad measurement plot. Thus, by fitting the vertical locations of the bed boundaries as measured by the four sensors to a sinusoidal curve, or by using Equation (9), the dip angle can be defined. In addition to detecting dip planes, the same technique can also be used to detect a fault or fracture that intercepts the borehole.

Figure 19:
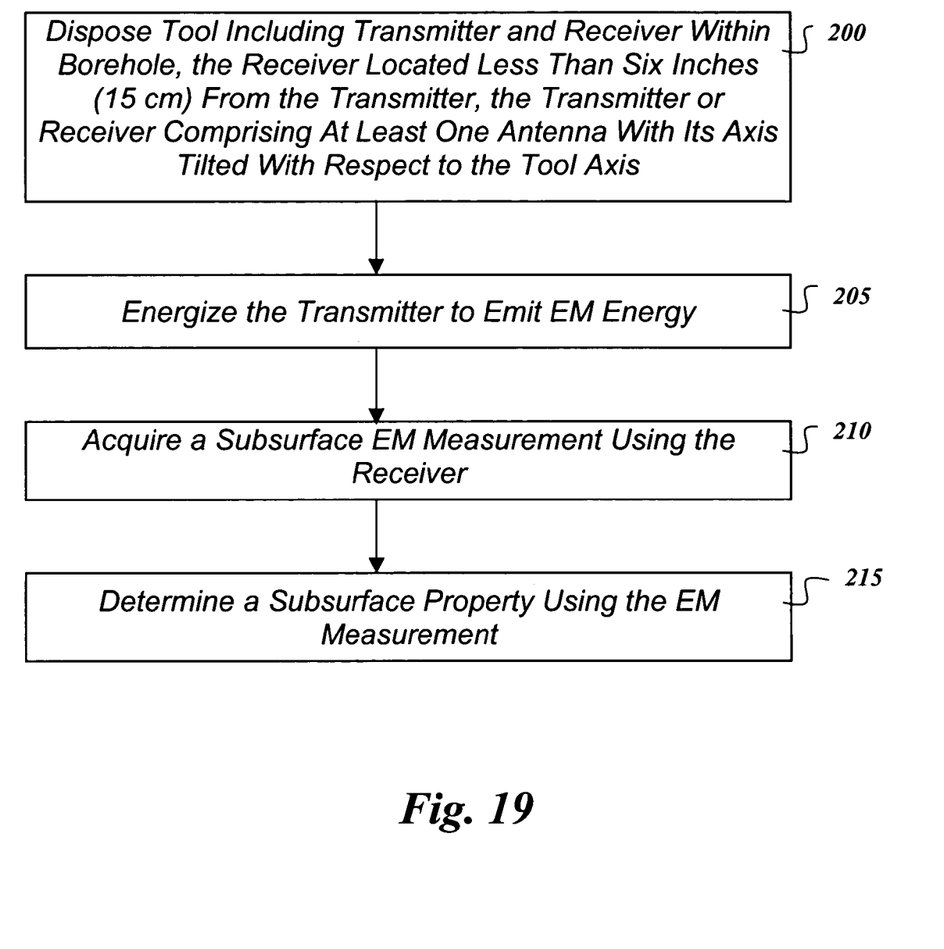
FIG. 19 is a flow chart of a method for subsurface imaging in accord with the invention.

FIG. 19 illustrates a process for determining subsurface properties in accordance with an embodiment of the invention. A resistivity tool (e.g. a microimager), including a sensor 20 of the invention, is disposed within a borehole (step 200). The borehole may contain a resistive mud (e.g. OBM) from the drilling process. A transmitter antenna in the sensor is energized to emit EM energy (step 205). EM measurements are made using a receiver in the sensor (step 210). In some embodiments of the invention, transmitter antennas are energized at different times or at different frequencies to enable measurements of multiple couplings. The measurements may be performed with the sensor in close proximity to the borehole wall (e.g. with the sensor disposed on a deployable pad, an extendable piston, or a protruding tool section).

Next, the EM measurements are used to determine a subsurface property (step 215). For example, the EM measurements may be used to derive a borehole image, to determine layer boundaries, to determine sensor-borehole distances, and other subsurface parameters as described herein. As noted above, measurements obtained with a sensor of the invention provide "relative" resistivities of the formation in the near wellbore regions. The relative resistivities are obtained with a high frequency, and most likely in a background invaded by drilling fluids (i.e. relatively uniform background resistivity). Therefore, these measurements will be sensitive to small variations in resistivities around the borehole and suitable for image construction. In accordance with embodiments of the invention, the transmitter-receiver spacings may be on the order of 2 inches (5 cm) or less, and preferably on the order of 1 inch (2.54 cm) or less. In a formation with relative dips, measurements of the invention may also be used to derive the dip angles of the dipping planes, as noted above.

The present invention provides several advantages. Sensors in accordance with embodiments of the invention are capable of measuring the resistivities of formations in boreholes drilled with all mud types including OBM and are substantially insensitive to tool standoff or similar borehole effects. The sensors measure relative resistivities to provide high resolution images of the borehole in wells drilled with the various types of muds. The measurements can also be used to construct bed-dipping logs. A borehole fracture or fault analysis could also be obtained from such a measurement. The measurements obtained using sensors of the invention may also be used for geosteering—e.g., to keep the well path within the pay zone and to avoid crossing a boundary.

When a sensor of the invention is disposed in a conductive housing (e.g. metallic drill collar), undesired EM fields may be induced in the housing. A mechanism to minimize the induction may be needed. Embodiments of the invention may be implemented with shielding mechanisms comprising a suitable liner disposed within the sensor cavity (e.g. ceramic or rubber composites, metallic linings) to attenuate undesired EM fields near the sensor as known in the art (not shown). It is noted that even with a shielding mechanism, some interference between the sensor and the conductive housing may be unavoidable.

While the invention has been described with respect to a limited number of embodiments, those skilled in the art, having the benefit of this disclosure, will appreciate that other embodiments can be devised which do not depart from the scope of the invention. For example, the sensor antennas may be configured with multiple dielectric substrates overlaying one another to achieve modified couplings or to alter the magnetic moments as desired. Other embodiments may be implemented with the sensors disposed on non-conductive or non-metallic tubulars (e.g. composite tubulars as described in U.S. Pat. Nos. 6,300,762, 6,084,052).

What is claimed is:

1. A resistivity imaging tool for determining subsurface properties, comprising: an elongated body having a longitudinal axis and adapted for disposal within a subsurface borehole; a transmitter disposed on the body and adapted to transmit electromagnetic energy; and a receiver disposed on the body at a distance two inches (5 cm) or less from the transmitter and adapted to receive electromagnetic energy; wherein the transmitter or receiver comprises at least one antenna with its axis tilted with respect to the longitudinal body axis, wherein each transmitter and receiver comprises two antennas with their axes substantially orthogonal to one another, the transmitter antennas and the receiver antennas being arranged in the same orthogonal directions; and     wherein the transmitter and receiver are both disposed in an insulating material within a cavity on the elongated body.

2. The tool of claim 1, wherein the transmitter is adapted to operate at a frequency between 1 MHz and 500 MHz.

3. The tool of claim 1, wherein the distance between the transmitter and receiver is less than two inches (5 cm).

4. The tool of claim 1, wherein the transmitter comprises an antenna with its axis substantially aligned with the longitudinal axis of the elongated body.

5. The tool of claim 1, wherein the receiver comprises an antenna with its axis substantially aligned with the longitudinal axis of the elongated body.

6. The tool of claim 1, wherein the receiver and transmitter each comprise an antenna with its axis substantially aligned with the longitudinal axis of the elongated body.

7. The tool of claim 1, wherein the transmitter comprises an antenna with its axis substantially perpendicular to the longitudinal axis of the elongated body.

8. The tool of claim 1, wherein the receiver comprises an antenna with its axis substantially perpendicular to the longitudinal axis of the elongated body.

9. The tool of claim 1, wherein the transmitter and receiver each comprise an antenna with its axis substantially perpendicular to the longitudinal axis of the elongated body.

10. The tool of claim 9, the receiver and transmitter each further comprising an antenna with its axis substantially aligned with the longitudinal axis of the elongated body.

11. The tool of claim 1, wherein the elongated body comprises an extendable section on which the cavity including the transmitter and receiver are disposed.

12. The tool of claim 1, wherein the elongated body comprises a protruding section on which the cavity including the transmitter and receiver an disposed.

13. The tool of claim 1, wherein the elongated body is adapted for subsurface disposal during drilling of the borehole.

14. The tool of claim 1, wherein the receiver or transmitter comprises a tri-axial antenna system adapted to transmit or receive electromagnetic energy.

* * * * *